(12) United States Patent
Vacca et al.

(10) Patent No.: US 9,548,597 B2
(45) Date of Patent: Jan. 17, 2017

(54) CABLE MANAGEMENT ASSEMBLIES AND ASSOCIATED METHODS

(71) Applicant: Ortronics, Inc., New London, CT (US)

(72) Inventors: Chris M. Vacca, Westerly, RI (US); Michael J. Moldoch, Griswold, CT (US)

( * ) Notice: Subject to any disclaimer, the term of this patent is extended or adjusted under 35 U.S.C. 154(b) by 0 days.

(21) Appl. No.: 14/303,889

(22) Filed: Jun. 13, 2014

(65) Prior Publication Data
US 2015/0362094 A1    Dec. 17, 2015

(51) Int. Cl.
*H02G 3/32* (2006.01)
*F16B 21/02* (2006.01)

(52) U.S. Cl.
CPC .......... *H02G 3/32* (2013.01); *F16B 21/02* (2013.01); *Y10T 24/398* (2015.01)

(58) Field of Classification Search
CPC .......... F16B 21/02; F16B 21/04; F16L 3/13; F16L 3/10; H02G 3/28; H02G 3/32; Y10T 24/4578; Y10T 24/398
USPC ......... 248/74.2, 71; 403/314, 348, 353, 383; 411/553, 349, 549
See application file for complete search history.

(56) References Cited

U.S. PATENT DOCUMENTS

| | | | | |
|---|---|---|---|---|
| 2,826,388 A | * | 3/1958 | Janos | A47B 96/068 248/222.52 |
| 2,921,607 A | | 1/1960 | Caveney | |
| 2,940,558 A | * | 6/1960 | Schlueter | F16B 5/10 248/222.52 |
| 2,984,698 A | * | 5/1961 | Strauss | H01B 17/58 174/138 R |
| 3,515,363 A | * | 6/1970 | Fisher | 248/71 |
| 3,705,949 A | | 12/1972 | Weiss | |
| 3,826,458 A | * | 7/1974 | Fisher | F16B 13/04 248/239 |
| 4,023,758 A | * | 5/1977 | Yuda | F16L 3/13 248/73 |
| 4,131,258 A | * | 12/1978 | Okuda et al. | 248/73 |
| 4,195,807 A | * | 4/1980 | Llauge | 248/74.2 |
| D257,950 S | * | 1/1981 | Van Meter et al. | D8/396 |
| 4,437,633 A | * | 3/1984 | Andre | 248/68.1 |
| 4,467,987 A | * | 8/1984 | Small | 248/68.1 |
| 4,705,442 A | * | 11/1987 | Fucci | 411/510 |
| D302,938 S | * | 8/1989 | Fujioka | D8/356 |
| 4,893,978 A | * | 1/1990 | Frano | A44B 99/005 24/297 |

(Continued)

OTHER PUBLICATIONS

Cable Management Rings, Snap Type, 1.75×3", OR-60400302, Legrand, West Hartford, CT, USA, available at http://www.legrand.us/ortronics/racks-cabinets/rack-systems/accessories/mighty-mo/or-60400302.aspx?utm_source=/ortronics/racks-cabinets/rack-systems/accessories/mighty-mo/or-60400302&utm_medium=redirect, retrieved May 28, 2014.

*Primary Examiner* — Ingrid M Weinhold
(74) *Attorney, Agent, or Firm* — McCarter & English, LLP (57) ABSTRACT

A cable management assembly is provided that facilitates routing of cables from a rack, frame or cabinet. The cable management assembly may be mounted in a vertical or a horizontal orientation, and generally includes a flange, a pair of fingers extending outwardly relative to the flange and defining a routing region therebetween, at least one mounting element extending rearwardly relative to the flange; and a polygonal locking face mounted with respect to the at least one mounting element. The cable management assembly may be mounted with respect to a rack structure by introducing the polygonal locking face to a correspondingly shaped aperture and rotating the cable management assembly, e.g., by a quarter turn.

13 Claims, 7 Drawing Sheets

(56) References Cited

U.S. PATENT DOCUMENTS

| | | | |
|---|---|---|---|
| 4,917,340 A * | 4/1990 | Juemann et al. | 248/74.2 |
| 5,039,040 A * | 8/1991 | Idjakiren | 248/73 |
| 5,806,811 A | 9/1998 | Viklund | |
| 6,220,554 B1 * | 4/2001 | Daoud | 248/74.1 |
| 6,489,565 B1 | 12/2002 | Krietzman | |
| 6,554,232 B1 * | 4/2003 | Macris | 248/71 |
| 6,946,605 B2 | 9/2005 | Levesque | |
| 7,523,898 B1 * | 4/2009 | Barry et al. | 248/71 |
| 7,527,226 B2 * | 5/2009 | Kusuda et al. | 248/71 |
| 2001/0008265 A1 * | 7/2001 | Hauer | 248/74.2 |
| 2001/0036392 A1 * | 11/2001 | Reddicliffe | F16B 19/00 411/349 |
| 2002/0190166 A1 * | 12/2002 | Bagdi | 248/71 |
| 2003/0213876 A1 * | 11/2003 | Takeuchi | 248/71 |
| 2005/0139732 A1 * | 6/2005 | Kato | 248/71 |
| 2005/0141984 A1 * | 6/2005 | Gombert | 411/349 |
| 2011/0268413 A1 * | 11/2011 | Cote et al. | 385/135 |
| 2013/0047413 A1 * | 2/2013 | Burton | 29/525.11 |

\* cited by examiner

CABLE MANAGEMENT ASSEMBLIES AND ASSOCIATED METHODS

BACKGROUND OF THE DISCLOSURE

1. Technical Field

The present disclosure is directed to cable management assemblies that facilitates routing of cables and, more particularly, to cable management assemblies that are easily and efficiently mounted with respect to racks, frames, enclosures and other cable-related structures in vertical or horizontal orientations.

2. Background

It is common to store computers, servers and other electronic equipment on or in racks, frames and cabinets. Numerous cables and wires are routinely required to power and interconnect these units, as is well known in the art. Efficient, reliable and organized routing of cables and wires to and from such equipment is highly desirable, but not easily achieved.

Prior art efforts have been devoted to developing raceways for routing cables and wires to and from equipment mounted/stored on/in racks, frames and cabinets. Prior art raceways generally permit cables/wires to be routed to equipment mounted/stored on/in racks, frames and cabinets. The routed cables/wires may enter the raceway from a variety of locations, e.g., from other equipment on the rack/frame/cabinet, from an overhead raceway, and/or from an underfloor raceway. With conventional raceways, cables/wires are generally routed vertically to a desired height, and then horizontally to an interconnection position relative to the desired equipment unit.

Prior art teachings that relate to the field of cable management include U.S. Pat. No. 2,921,607 to Caveney, U.S. Pat. No. 3,705,949 to Weiss, U.S. Pat. No. 5,806,811 to Viklund et al., U.S. Pat. No. 6,489,565 to Krietzman et al., and U.S. Pat. No. 6,946,605 to Levesque et al. Cable management products/systems are commercially available from numerous manufacturers, including Ortronics, Inc. (New London, Conn.), Panduit Corporation (Tinley Park, Ill.) and Chatsworth Products, Inc. (Westlake Village, Calif.).

For example, Ortronics commercially offers "snap type" cable management rings (OR-60400302) that are designed to promote efficient routing of patch and cross connect cables. The commercially available snap type rings include two spaced/aligned extensions that snap in place on the front and back of Mighty Mo® racks and generally accommodate up to thirty five (35) Category 6 cables. To accommodate the snap type rings, Mighty Mo® racks include spaced/aligned apertures that are sized to receive the extensions that include spring-finger anchor mechanisms for retention purposes. Of note, to release a snap type ring from a rack, it is disadvantageously necessary to pinch the spring-fingers together from the rear and then push the snap type ring out of engagement from the rack.

Despite efforts to date, a need remains for cable management assemblies that may be easily and securely mounted with respect to a rack/frame/cabinet/enclosure for routing cables/wires to and from equipment that is stored therein/thereon in both vertical and horizontal orientations.

SUMMARY OF THE DISCLOSURE

According to the present disclosure, advantageous cable management assemblies for use in vertical and/or horizontal applications are disclosed. The cable management assemblies generally include a flange that supports (i) a pair of outwardly extending fingers that are adapted to deflect so as to receive wires/cable in a routing region therebetween, and (ii) a rearwardly extending mounting element that is configured and dimensioned to releasably engage an aperture formed in a mounting structure, e.g., a rack, frame, cabinet, patch panel or enclosure. The mounting element advantageously defines a polygonal locking face that is spaced from and lies in a plane substantially parallel to the flange. Extension arm(s) extend between the rearward face of the flange and the inward face of the polygonal locking face. The polygonal locking face defines an outer periphery that extends outwardly of the extension arm(s), thereby facilitating the detachable locking function associated with the disclosed cable management assembly.

The disclosed cable management assembly is adapted for use in conjunction with a rack (e.g., network or server rack), frame, cabinet, patch panel, enclosure or other structure that stands to benefit from proximate cable management functionality. For ease of disclosure, the potential structures to which the disclosed cable management assembly may be detachably mounted are collective referred to as "rack(s)." However, it is to be understood that the present disclosure is not limited by or to implementations wherein the disclosed cable management assembly is mounted with respect to, or used in conjunction with, a rack, but may be mounted with respect to, or used in conjunction with any structure/unit that is in proximity to or otherwise associated with cable routing.

In use, a rack is provided that includes one or more polygonal apertures that are configured and dimensioned to receive the polygonal locking face of the disclosed cable management assembly. Based on a cable routing need, a cable management assembly according to the present disclosure is detachably mounted with respect to a polygonal aperture formed in the rack by (i) inserting the polygonal locking face through the aperture, and (ii) rotating the cable management assembly relative to the rack so as to detachably lock the cable management assembly relative to the rack. For example, in implementations where the polygonal locking face is square in geometry, the cable management assembly is typically rotated about ninety (90) degrees, i.e., a quarter turn, to detachably lock the cable management assembly relative to the rack. Generally, the cable management assembly may rotated clockwise or counter-clockwise to like effect.

While a single extension arm may be used to join the locking face to the flange, molding operations may benefit from inclusion of voids/spaces in molding of the extension arm element(s). Thus, for example, a channel may be formed through an otherwise solid extension arm—thereby defining two side-by-side extension arm portions—to facilitate molding of the product and to avoid the potential for "sink marks" if the extension arm was a single, solid structure due to the cooling profile of the surface post-molding.

Of note, the extension arm(s) that join the polygonal locking face to the flange advantageously include chamfered triangular faces, i.e., inverted pyramidal surfaces, that define "crush zones" for purposes of detachable mounting of the disclosed cable management assembly relative to the rack. The disclosed "crush zones" physically engage the periphery of the aperture formed in the rack, e.g., the sheet metal that defines a rack surface, as the cable management assembly is rotated. Physical engagement of the crush zone(s) with the periphery of the aperture causes displacement of material associated with the crush zone. More specifically, the extension arm(s) are typically fabricated from a plastic material, e.g., polycarbonate, and physical engagement of the crush zone(s) with the periphery of the rack aperture typically displaces or "gouges" the plastic in the crush zone(s). In exemplary embodiments, the extension arm(s) are tapered in the crush zone region(s), with a greater "diameter" (i.e., outward extent) in closer proximity to the locking face and a lesser "diameter" in closer proximity to the flange. The noted tapered geometry of the extension arm(s) facilitates mounting of the disclosed cable management assembly with respect to racks of differing construction, e.g., racks with wall thicknesses ranging up to 0.125" in thickness.

The outwardly extending fingers that extend from the flange are of substantially conventional design. The outwardly extending fingers are generally horizontally aligned and include transverse elements at respective distal ends thereof. The transverse elements are generally dimensioned such that a clearance is defined between adjacent transverse elements. The outwardly directed faces of the transverse elements generally define angled lead-in surfaces to guide cables/wires to pass through the clearance space defined between adjacent transverse elements. The outwardly extending fingers are typically fabricated from a material that exhibits some flexural capacity, such that the clearance between adjacent projecting arms can be increased by deflection of the fingers to better accommodate introduction/ withdrawal of cables/wires. The outwardly extending fingers are advantageously spaced by a distance equal to one rack unit, and the routing region defined between adjacent outwardly extending fingers facilitates cable/wire management activities, as will be readily apparent to persons skilled in the art.

The disclosed cable management assemblies may be mounted in various orientations relative to the rack. Thus, in an exemplary embodiment wherein the rack's aperture and the polygonal locking face are substantially square in geometry, the cable management assembly may be mounted in a horizontal alignment, i.e., with the outwardly extending fingers defining a horizontal plane, or in a vertical alignment, i.e. with the outwardly extending fingers defining a vertical plane. In the horizontal alignment, the disclosed cable management assembly is oriented to provide routing with respect to cables/wires that run vertically (or substantially vertically) in the vicinity of the cable management assembly. Conversely, in the vertical alignment, the disclosed cable management assembly is oriented to provide routing with respect to cables/wires that run horizontally (or substantially horizontally) in the vicinity of the cable management assembly. Of note, spaced placement of cable management assemblies according to the present disclosure is effective in routing cables/wires through vertical, horizontal and angular runs, as will be readily apparent to persons skilled in the art.

Additional advantageous features and functions associated with the disclosed cable management assemblies and associated routing methods will be apparent from the detailed description which follows, particularly when reviewed together with the appended figures.

BRIEF DESCRIPTION OF THE FIGURES

To assist those of ordinary skill in the art to which the subject matter of the present disclosure appertains to better understand how to make and use the cable management assemblies of the present disclosure, reference is made to the accompanying figures, wherein.

DETAILED DESCRIPTION OF EXEMPLARY EMBODIMENT(S)

The present disclosure provides advantageous cable management assemblies for use in vertical, horizontal and/or angled cable routing applications. As described herein, the disclosed cable management assemblies generally include a flange that supports (i) a pair of outwardly extending fingers that are adapted to deflect so as to receive wires/cable in a routing region therebetween, and (ii) a rearwardly extending mounting element that is configured and dimensioned to releasably engage an aperture formed in a mounting structure, e.g., a rack, frame, cabinet, patch panel or enclosure. The mounting element advantageously defines a polygonal locking face that is spaced from and lies in a plane substantially parallel to the flange. Extension arm(s) extend between the rearward face of the flange and the inward face of the polygonal locking face. The polygonal locking face defines an outer periphery that extends outwardly of the extension arm(s), thereby facilitating the detachable locking function associated with the disclosed cable management assembly.

Figure 1:
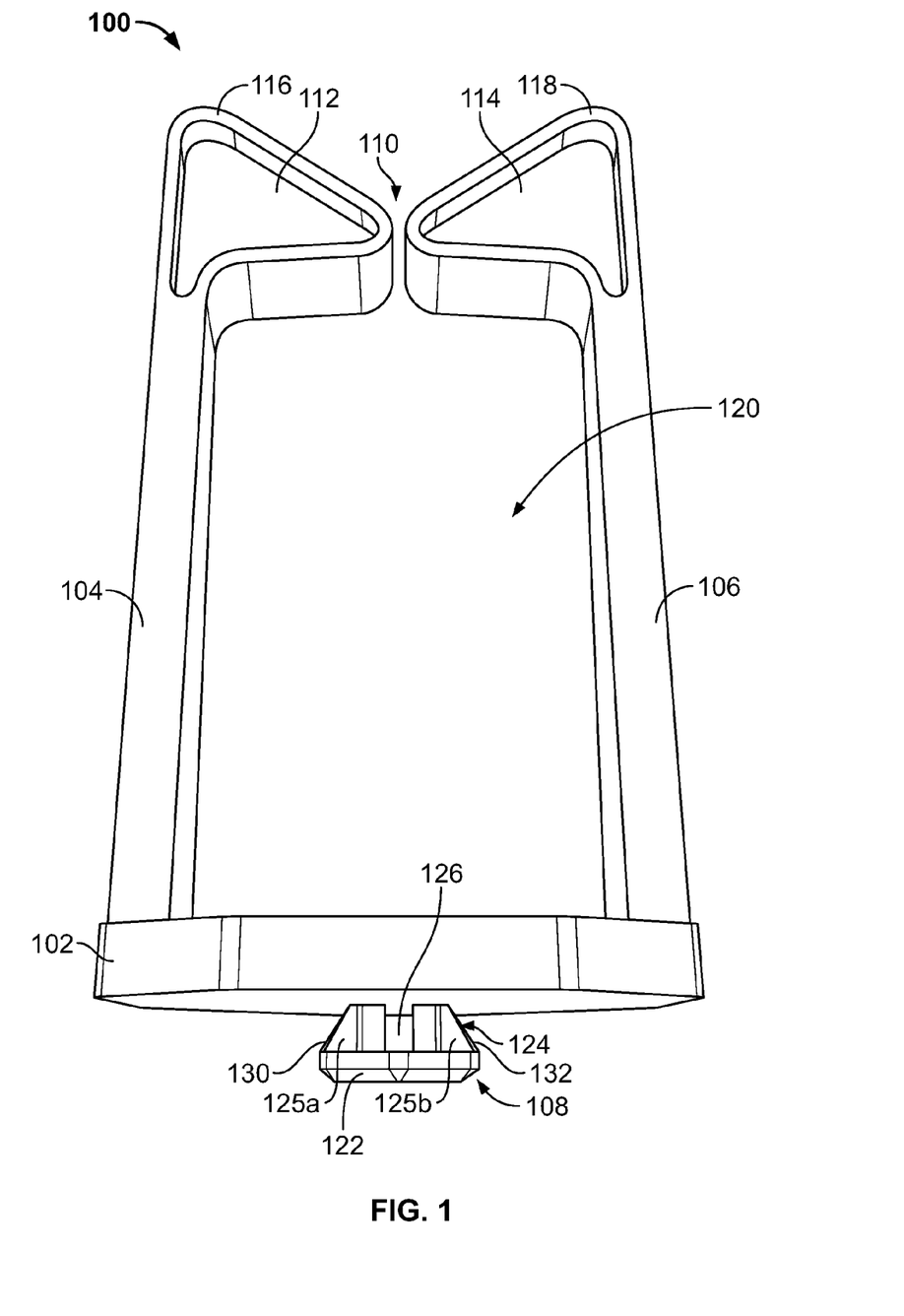
FIG. 1 is a side view of an exemplary cable management assembly according to the present disclosure.

With reference to FIGS. 1-4, exemplary cable management assembly 100 is schematically depicted. Cable management assembly 100 includes a flange 102 that supports outwardly extending fingers 104, 106 and rearwardly extending mounting element 108. Fingers 104, 106 are adapted to deflect inwardly/outwardly so as to permit wire (s)/cable(s) (not pictured) to pass through channel 110 defined between inwardly directed capture members 112, 114. In exemplary embodiments of the present disclosure, capture members 112, 114 define outwardly facing angled surfaces 116, 118 that guide wire(s)/cable(s) toward channel 110, thereby facilitating entry of the wire(s)/cable(s) into routing region 120. Thus, as best seen in FIG. 1, transverse capture members 112, 114 may advantageously define a substantially triangular geometry, although the present disclosure is not limited by or to such geometric configuration. The capture members 112, 114 may be molded with recessed regions (front and back) to reduce material and/or facilitate molding operations.

The length of fingers 104, 106 is generally selected so as to conform to space requirements and/or limitations associated with the environment of use. It is generally desirable to provide a routing region 120 that is sized to accommodate the quantity of wires/cables to be routed therethrough. For example, the overall length of fingers 104, 106 may be in the order of three inches (3") to six inches (6") when measured from flange 102 to the tip of capture member 112, 114, although alternative lengths may be employed without departing from the spirit or scope of the present disclosure. The width of capture region 120, i.e., the distance between fingers 104, 106, may be substantially constant when measured from the flange 102 to the capture members 112, 114, or may taper inwardly to a limited extent. For example, the width of routing region 120 may be on the order of 1¼ to 1½ inches, and may taper from the foregoing width to a lesser width in proximity to capture members 112, 114, e.g., a reduced width of approximately 1". The overall capacity for cable/wire routing through routing region 120 may be increased relative to prior art products, e.g., increases on the order of 12% to 15% relative to conventional Ortronics "snap type" cable management rings.

Flange 102 defines substantially planar top and bottom surfaces, and a thickness that is selected to provide sufficient structural stability/strength to the disclosed cable management assembly 100. For example, thicknesses on the order of ¼" are contemplated according to the present disclosure. The peripheral geometry of exemplary flange 102 defines a hexagon, although the present disclosure is not limited by or to an hexagonal flange geometry. For example, flange 102 may be advantageously formed as a substantially elliptical or square/rectangular geometry without departing from the present disclosure.

Figure 2:
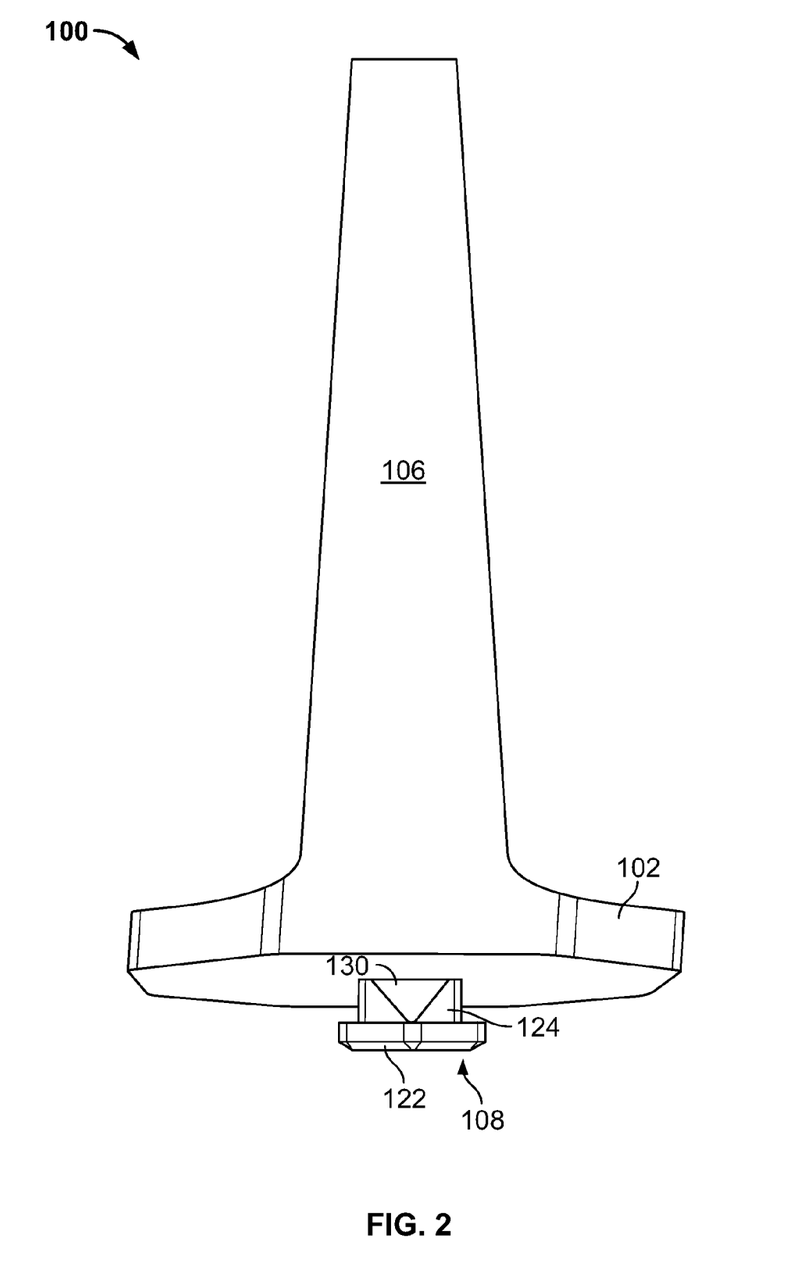
FIG. 2 is a side view of the exemplary cable management assembly of FIG. 1.
Figure 3:
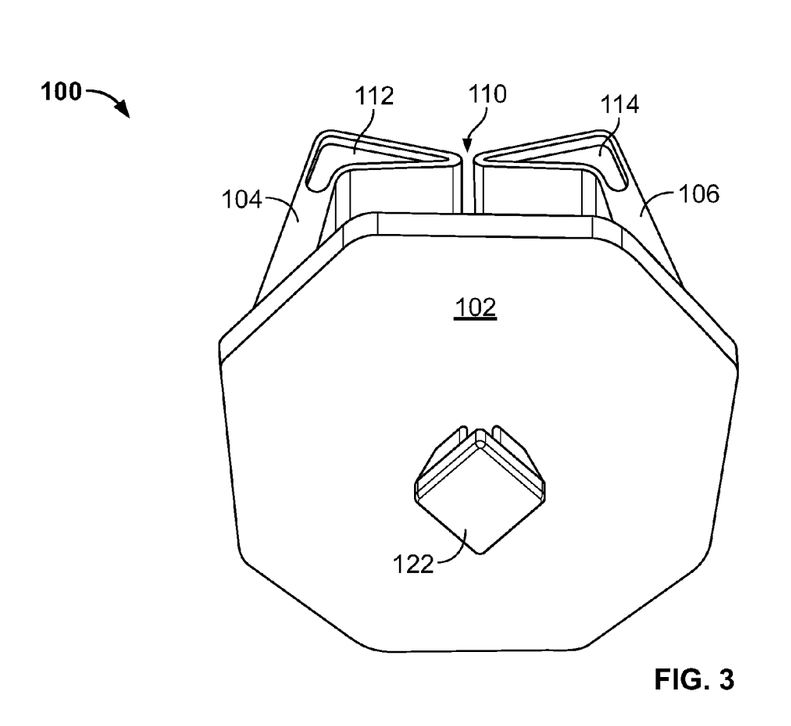
FIG. 3 is a perspective plan view of the exemplary cable management assembly of FIG. 1.
Figure 4:
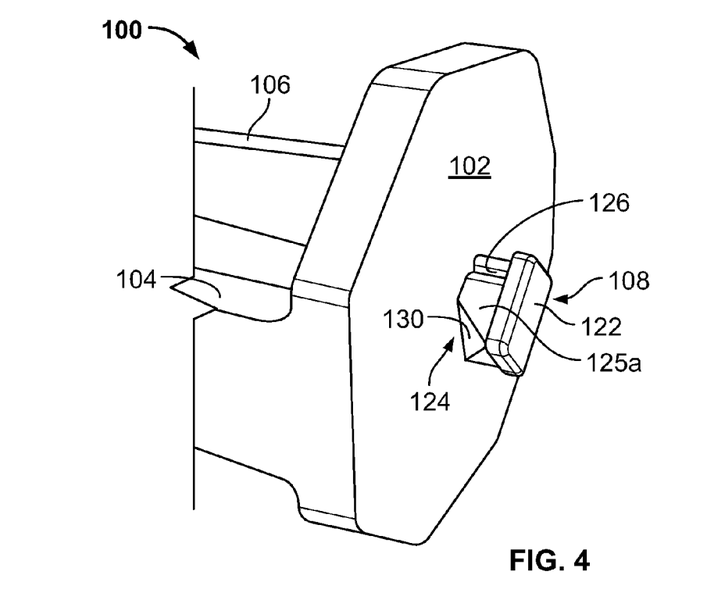
FIG. 4 is a side perspective view of a portion of the exemplary cable management assembly of FIG. 1.

As noted above, cable management assembly 100 includes a rearwardly extending mounting element 108 that is configured and dimensioned to releasably engage an aperture formed in a mounting structure, e.g., a rack, frame, cabinet, patch panel or enclosure. As best seen in FIGS. 1, 2 and 4, mounting element 108 defines a polygonal (e. g. square) locking member or face 122 that is spaced from flange 102 and that lies in a plane substantially parallel to the bottom surface of flange 102. Locking face member 122 is spaced from flange 102 by extension arm 124. As best seen in FIG. 1, exemplary extension arm 124 defines a channel 126 that extends between first and second side-by-side portions 125a, 125b of extension arm 124. Channel 126 is optionally provided to reduce material and/or assist in molding of cable management assembly 100. As shown in FIG. 2, at least a portion of the polygonal looking member 122 laterally extends past a side of the extension arm 124. The polygonal locking member defines a first corner, a second corner, a third corner, and a fourth corner. The first and fourth corners oppose one another, and the second and third corners oppose one another.

The extension arm 124 that joins polygonal locking member 122 to flange 102 advantageously includes chamfered triangular faces 130, 132, i.e., inverted pyramidal surfaces, that define "crush zones" for purposes of detachable mounting of the disclosed cable management assembly 100 relative to a rack. The triangular faces 130, 132 are generally angled relative to the planes defined by flange 102 and locking member 122. Of note, two of the angles associated with the triangular faces 130, 132 may be advantageously formed at the intersection of the triangular faces 130, 132 with the lower surface of flange 102, whereas the third angle associated with triangular faces 130, 132 is typically aligned with a corner of polygonal locking member 122. Triangular faces 130, 132 typically define isosceles triangles with equal angles defined at the interface with flange 102. In exemplary embodiments, triangular faces 130, 132 define equilateral triangles. The triangular faces 130, 132 are generally formed on opposite corners of extension arm 124.

Figure 5:
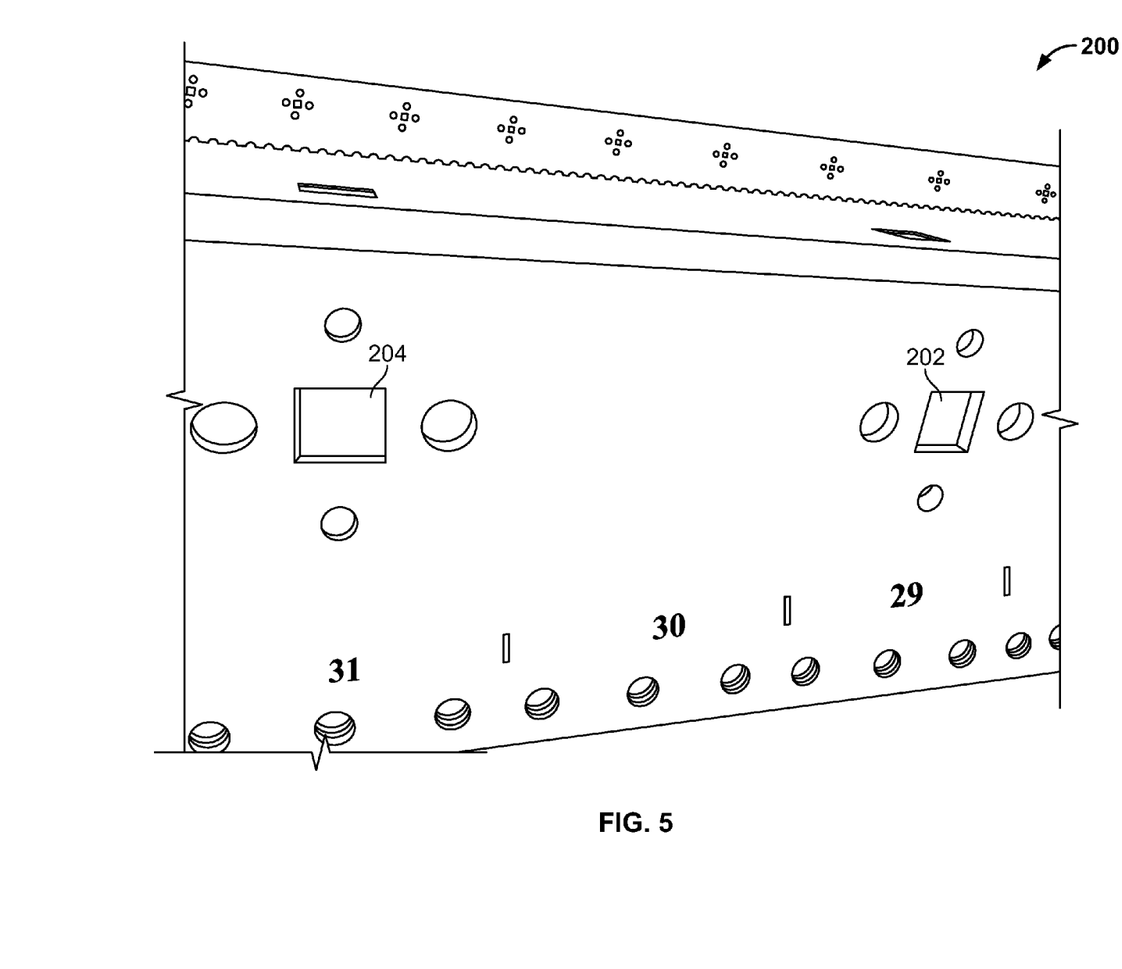
FIG. 5 is a side view of a portion of a rack that includes apertures for mounting of the cable management assembly of FIG. 1.
Figure 6:
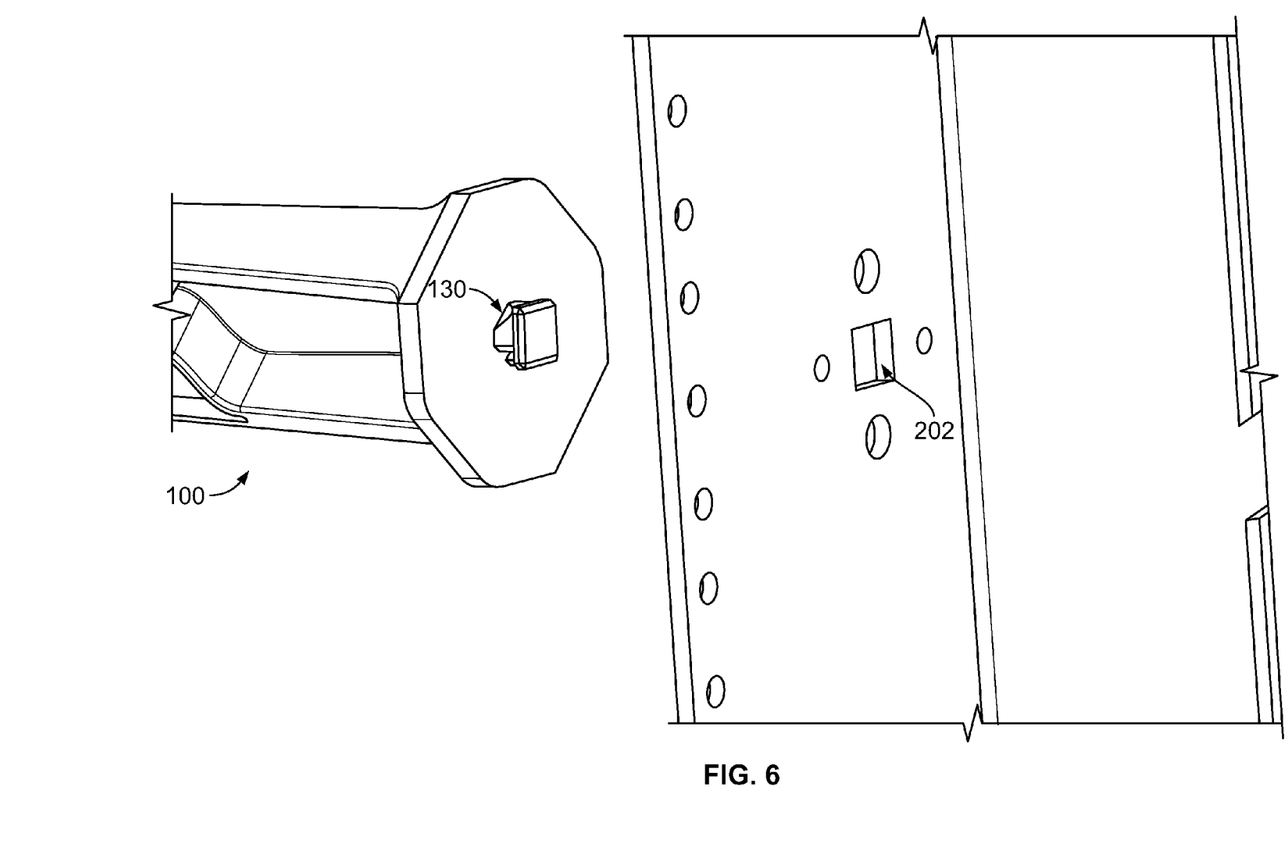
FIGS. 6-8 are perspective views of an exemplary cable management assembly prior to and after mounting to a rack.
Figure 7:
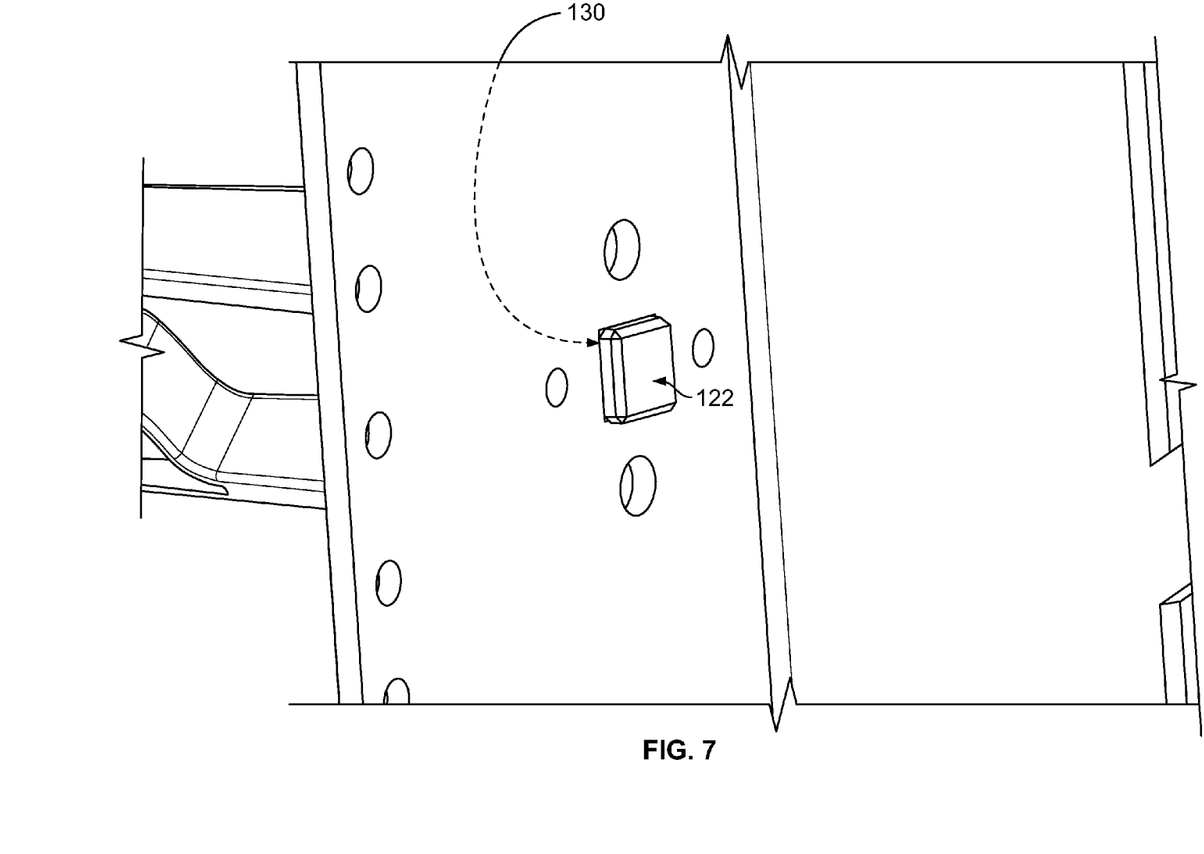
Figure 8:
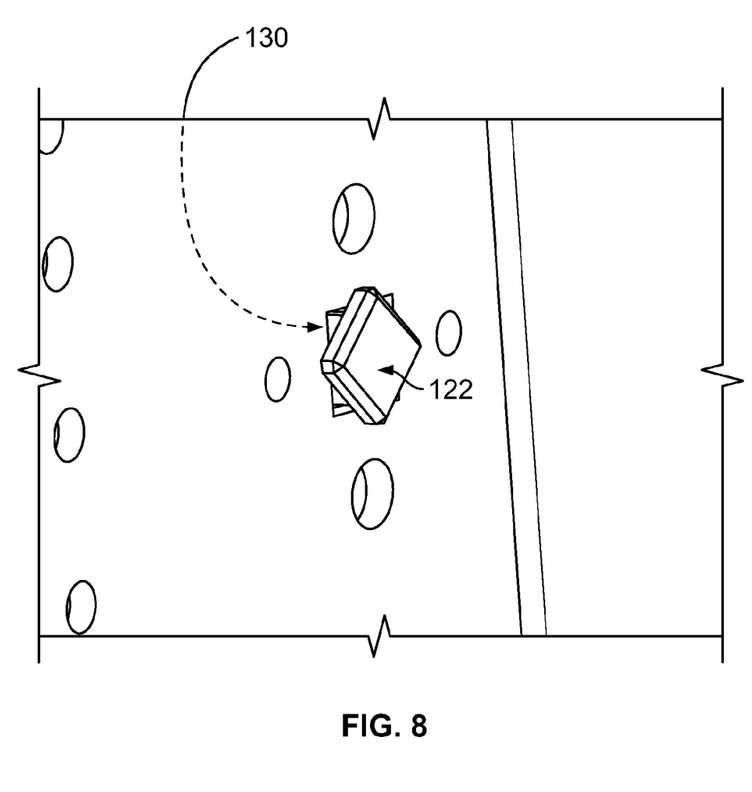

The disclosed "crush zones" defined by triangular faces 130, 132 are adapted to physically engage the periphery of the aperture formed in a rack to which the disclosed cable management assembly 100 is mounted as cable management assembly 100 is rotated. An exemplary polygonal (square) apertures 202, 204 defined with respect to an exemplary rack structure 200 are shown in FIG. 5. Physical engagement of the crush zone(s) of the triangular faces 130, 132 with the periphery of an aperture 202, 204 causes displacement of material associated with the crush zone. More specifically, the extension arm 124—including triangular faces 130, 132—is typically fabricated from a plastic material, e.g., polycarbonate, and physical engagement of the crush zone (s) with the periphery of the rack aperture 202, 204 typically displaces or "gouges" the plastic in the crush zone(s). In exemplary embodiments, the extension arm 124 is tapered in the crush zone region(s), with a greater "diameter" (i.e., outward extent) in closer proximity to the locking member 122 and a lesser "diameter" in closer proximity to the flange 102. The noted tapered geometry of the extension arm 124 facilitates mounting of the disclosed cable management assembly 100 with respect to racks of differing construction, e.g., racks with wall thicknesses ranging up to 0.125" in thickness.

As noted above, the disclosed cable management assembly is adapted for use in conjunction with a rack (e.g., network or server rack), frame, cabinet, patch panel, enclosure or other structure (collectively, "rack") that stands to benefit from proximate cable management functionality. In use, a rack is provided that includes one or more polygonal apertures (e.g., square aperture(s)) that are configured and dimensioned to receive the polygonal locking member of the disclosed cable management assembly. Based on a cable routing need, a cable management assembly according to the present disclosure is detachably mounted with respect to a polygonal aperture formed in the rack by (i) inserting the polygonal locking member through the aperture, and (ii) rotating the cable management assembly relative to the rack so as to detachably lock the cable management assembly relative to the rack. For example, in implementations where the polygonal locking member is square in geometry, the cable management assembly is typically rotated about ninety (90) degrees, i.e., a quarter turn, to detachably lock the cable management assembly relative to the rack. Generally, the cable management assembly may rotated clockwise or counter-clockwise to like effect. The square locking member is generally centrally positioned on the flange, and oriented such that a corner of the square bisects the routing region defined by the outwardly extending fingers. In exemplary embodiments, the outer face of the locking member is spaced from the lower surface of the flange by about ⅜", although the present disclosure is not limited by or to such dimensional arrangement. The cable management assembly may be fabricated such that the flange, the pair of deflectable fingers, the at least one mounting element and the polygonal locking member are integrally formed, e.g., integrally molded.

The disclosed cable management assemblies may be mounted in various orientations relative to the rack. Thus, in an exemplary embodiment wherein the rack's aperture and the polygonal locking member are substantially square in geometry, the cable management assembly may be mounted in a horizontal alignment, i.e., with the outwardly extending fingers defining a horizontal plane, or in a vertical alignment, i.e. with the outwardly extending fingers defining a vertical plane. In the horizontal alignment, the disclosed cable management assembly is oriented to provide routing with respect to cables/wires that run vertically (or substantially vertically) in the vicinity of the cable management assembly. Conversely, in the vertical alignment, the disclosed cable management assembly is oriented to provide routing with respect to cables/wires that run horizontally (or substantially horizontally) in the vicinity of the cable management assembly. Of note, spaced placement of cable management assemblies according to the present disclosure is effective in routing cables/wires through vertical, horizontal and angular runs, as will be readily apparent to persons skilled in the art.

Although advantageous cable management assemblies according to the present disclosure have been described with reference to exemplary embodiments thereof, it is to be understood that the present disclosure is not limited to the specifically disclosed embodiments. Rather, the exemplary embodiments described herein are merely illustrative of implementations of the disclosed cable management assemblies and methods for use thereof. The present disclosure specifically encompasses alternative and/or modified embodiments of the disclosed cable management assemblies, as set forth in the accompanying claims hereto.

What is claimed is:

1. A cable management assembly comprising:
   a. a flange;
   b. a pair of fingers extending outwardly relative to the flange and defining a routing region therebetween,
   c. at least one mounting element extending rearwardly relative to the flange, the at least one mounting element defining a polygonal locking member that is spaced from the flange by an extension arm, the polygonal locking member defining a first corner, a second corner, a third corner and a fourth corner, wherein the first and fourth corners oppose one another and the second and third corners oppose one another;
   wherein the extension arm defines an open channel that extends: (i) between the polygonal locking member and the flange, and (ii) from between the second corner to and the third corner of the polygonal locking member;
   wherein the open channel separates the extension arm into a first side portion and a second side portion;
   wherein the first side portion of the extension arm includes a first chamfered triangular surface that extends from the first corner of the polygonal locking member, and the second side portion of the extension arm includes a second chamfered triangular surface that extends from the fourth corner of the polygonal locking member;
   wherein the second corner of the polygonal locking member laterally extends past a first side of the first side portion of the extension arm and laterally extends past a first side of the second side portion of the extension arm;
   wherein the third corner of the polygonal locking member laterally extends past a second side of the first side portion of the extension arm and laterally extends past a second side of the second side portion of the extension arm;
   wherein the at least one mounting element is configured and dimensioned to releasably engage an aperture formed in a mounting structure; and
   wherein the first and second chamfered triangular surfaces are each configured and dimensioned to physically engage a periphery of the aperture to gouge material of the first and second chamfered triangular surfaces when the at least one mounting element is rotatably and detachably mounted relative to the mounting structure.

2. The cable management assembly according to claim 1, wherein the first chamfered triangular surface defines an equilateral triangular surface.

3. The cable management assembly according to claim 1, wherein the flange defines planar top and bottom surfaces;
   wherein the polygonal locking member lies in a plane that is substantially parallel to the bottom surface of the flange; and
   wherein the first chamfered triangular surface is angled relative to the plane of the polygonal locking member.

4. The cable management assembly according to claim 3, wherein the polygonal locking member is spaced from the bottom surface of the flange by about ⅜".

5. The cable management assembly according to claim 1, wherein the polygonal locking member defines a square, and wherein a plane passing through the second and third corners of the locking member bisects the routing region.

6. The cable management assembly according to claim 1, wherein the polygonal locking member is centrally positioned relative to the flange.

7. The cable management assembly according to claim 1 wherein the flange, the pair of fingers, and the at least one mounting element are integrally formed.

8. The cable management assembly according to claim 7, wherein the flange, the pair of fingers, and the at least one mounting element are integrally molded.

9. A method for detachably mounting a cable management assembly relative to a rack structure, comprising:
   (a) providing a rack structure that includes at least one polygonal aperture;
   (b) providing a cable management assembly that includes (i) a flange; (ii) a pair of fingers extending outwardly relative to the flange and defining a routing region therebetween, and (iii) at least one mounting element extending rearwardly relative to the flange, the at least one mounting element defining a polygonal locking member that is spaced from the flange by an extension arm with the polygonal locking member defining a first corner, a second corner, a third corner and a fourth corner, wherein the first and fourth corners oppose one another and the second and third corners oppose one another, wherein the extension arm defines an open channel that extends: (i) between the polygonal locking member and the flange, and (ii) from between the second corner and the third corner of the polygonal locking member, the open channel separating the extension arm into a first side portion and a second side portion, wherein the first side portion of the extension arm includes a first chamfered triangular surface that extends from the first corner of the polygonal locking member and the second side portion of the extension arm includes a second chamfered triangular surface that extends from the fourth corner of the polygonal locking member;
   (c) positioning the polygonal locking member of the cable management assembly within the aperture of the rack structure; and
   (d) rotating the cable management assembly in a first direction relative to the rack structure to physically engage the first and second chamfered triangular surfaces to a periphery of the aperture of the rack structure, wherein the physical engagement of the first and second chamfered triangular surfaces with the periphery of the aperture gouges material of the first and second chamfered triangular surfaces;
   wherein the second corner of the polygonal locking member laterally extends past a first side of the first side portion of the extension arm and laterally extends past a first side of the second side portion of the extension arm; and
   wherein the third corner of the polygonal locking member laterally extends past a second side of the first side portion of the extension arm and laterally extends past a second side of the second side portion of the extension arm.

10. The method according to claim 9, wherein the polygonal locking member of the cable management assembly and the aperture of the rack structure define square geometries, and wherein a plane passing through the second and third corners of the locking member bisects the routing region defined by the cable management assembly.

11. The method according to claim 9, wherein the cable management assembly is detachably engaged relative to the rack structure by rotating the cable management assembly in either a clockwise or counter-clockwise direction.

12. The method according to claim 9, wherein the rack structure is selected from the group consisting of a network rack, server rack, frame, cabinet, patch panel, and enclosure.

13. The method according to claim 9, further comprising detachment of the cable management assembly from the rack structure by rotating the cable management assembly in a second direction that is opposite the first direction and removing the polygonal locking member of the cable management assembly from the aperture of the rack structure.

* * * * *